United States Patent [19]
Figi et al.

[11] Patent Number: 5,915,286
[45] Date of Patent: Jun. 22, 1999

[54] SAFETY RESTRAINT SENSOR SYSTEM

[75] Inventors: Bruce B. Figi, Rockford; Kent E. Van Ostrand, Freeport, both of Ill.

[73] Assignee: Honeywell Inc., Minneapolis, Minn.

[21] Appl. No.: 09/106,535

[22] Filed: Jun. 29, 1998

[51] Int. Cl.⁶ .................................................. G01N 19/00
[52] U.S. Cl. ............................................................ 73/865.9
[58] Field of Search .......................... 73/865.9; 280/804; 297/468; 324/207.2

[56] References Cited

U.S. PATENT DOCUMENTS

| | | |
|---|---|---|
| 3,147,819 | 9/1964 | Keleher . |
| 4,920,620 | 5/1990 | Yamamoto . |
| 4,943,087 | 7/1990 | Sasaki . |
| 5,218,744 | 6/1993 | Saito . |
| 5,742,986 | 4/1998 | Corrion et al. . |
| 5,752,299 | 5/1998 | Vivacqua et al. . |

OTHER PUBLICATIONS

A Book Entitled Hall Effect Transducers—How to Apply Them as Sensors, Honeywell, Micro Switch Division, 1982, pp. 7–11 & 90–95.

*Primary Examiner*—Robert Raevis
*Attorney, Agent, or Firm*—Roland W. Norris; Kevin D. Erickson

[57] ABSTRACT

A safety restraint sensor system for detecting a latched position and/or an unlatched position of a latch and a buckle. The latch is movably mounted with respect to a housing. A vane projects from the latch. A magnet and a Hall element are mounted with respect to the housing. When the buckle engages the latch, the vane and the buckle move within the magnetic field of the magnet. A magnetic field is distributed through the Hall element by way of the buckle and the vane. The Hall element sends a signal indicating the latched position to an appropriate receptor, such as a safety restraint.

20 Claims, 5 Drawing Sheets

SAFETY RESTRAINT SENSOR SYSTEM

BACKGROUND OF THE INVENTION

1. Field of the Invention

This invention relates to a safety restraint sensor system having a Hall element for determining whether a buckle is in a latched position with respect to a latch.

2. Discussion of Related Art

Conventional safety restraints, such as seat belts, use sensors which are activated when a buckle is inserted into a housing of the safety restraint assembly, in order to detect whether the buckle is securely latched. Conventional safety restraint assemblies also use magnets and magnetic flux sensors to detect whether the buckle is securely latched.

Sasaki, U.S. Pat. No. 4,943,087 discloses a conventional seat buckle assembly with a magnetic flux sensor to detect whether a buckle is within a housing of the seat buckle assembly. A magnet mounted on the buckle and a magnetic flux sensor arranged between an anchor base member and an emergency release buckle of the housing shield the magnetic flux sensor from detecting magnetic flux other than the magnet flux of the magnet. The magnetic flux sensor detects magnetic flux from the magnet mounted on the buckle and thus the presence of the buckle. When the buckle and the magnet are moved near the magnetic flux sensor, the magnetic flux sensor activates upon detection of the magnetic flux from the magnet. The magnetic flux sensor may be a Hall element.

Because the magnetic flux sensor taught by the '087 patent detects a presence of the buckle by sensing magnetic flux, any other magnetic flux can cause the magnetic flux sensor to detect a false positive latch condition. A false positive latch condition occurs when a sensor, such as the magnetic flux sensor, detects the presence of a buckle within a housing or latch and the buckle is either not within the housing, or the buckle is not fully latched within the housing. Because the magnet is mounted on the buckle for the magnetic flux sensor to detect the presence of the buckle, and because the buckle is constructed of ferrous material, the manufacturing process of the sensor of the '087 patent is relatively complex.

Saito, U.S. Pat. No. 5,218,744 teaches a magnet and a magnet holder molded or encased around the magnet. The magnet and the magnet holder are mounted on a buckle for use with a conventional seat buckle assembly which has a magnetic flux sensor. The magnetic flux sensor detects a presence of the buckle within a housing of the seat buckle assembly when the magnet and the buckle are positioned near the magnetic flux sensor. The magnetic flux sensor of the '744 patent may also detect a false positive latch condition. Because the magnet taught by the '744 patent is attached to the buckle, the manufacturing process for positioning and then constructing the buckle is also relatively complex.

Yamamoto et al., U.S. Pat. No. 4,920,620 teaches a mechanical sensor for detecting whether a buckle is inserted within a housing of a seatbelt buckle assembly. The mechanical sensor moves from a disengaged position to an engaged position when the buckle is inserted within the housing and locked with a latch piece. The seat buckle assembly of the '620 patent purportedly prevents a false latch condition, because the mechanical sensor does not move from the disengaged position until the buckle is engaged in the housing. The mechanical sensor taught by the '620 patent has more moving or wearing parts than the magnetic flux sensor, thus the mechanical sensor is more likely to fail.

*Hall Effect Transducers—How To Apply Them As Sensors,* Honeywell, MICRO SWITCH Division, 1982, (the Honeywell reference) teaches how to combine a Hall element with a magnet to create a Hall sensor which can detect a magnetic field and, as a result, the presence or absence of a vane. The Hall element is positioned near the magnet and activated by a magnetic flux. When a vane is introduced between the Hall element and the magnet, the magnetic flux is shunted in a direction parallel to the vane, and the Hall sensor is electronically placed in an OFF state. The arrangement of the Hall element, the magnet, and the vane is called a vane operated position sensor, or a vane sensor.

Conventional sensors for safety restraints have several shortcomings. For example, in many conventional seat buckle assemblies a magnet is mounted on a buckle constructed of a ferrous material. The magnetic attraction between the magnet and the buckle makes it difficult to handle the magnet during assembly and thus complicates the manufacturing process.

Conventional sensors for safety restraints are also prone to developing false latch conditions. Conventional safety restraints may indicate a false latched position when the buckle is inserted but the latch is not fully engaged. Conversely, a conventional safety restraint may indicate a latched position when the latch is fully engaged but the buckle is not fully inserted. Many conventional sensors attempt to eliminate the false positive latch condition by using a mechanical sensor instead of a magnetic sensor. Mechanical sensors have more moving parts and thus are predictably less reliable than magnetic sensors.

There is an apparent need for an inexpensive, easily manufactured safety restraint sensor system having a latch position sensor. There is also an apparent need for a safety restraint sensor system having the capability to detect that both a buckle and a latch are in a latched position and/or an unlatched position.

SUMMARY OF THE INVENTION

It is one object of this invention to provide a safety restraint sensor system having the capability to detect that both a buckle and a latch are in a latched position and/or an unlatched position.

It is another object of this invention to provide a safety restraint sensor system that will not indicate a latched position if a buckle is in a housing and not fully latched.

It is another object of this invention to provide a safety restraint sensor system that will not indicate a latched position if a latch is moved into the latched position without the presence of a buckle.

It is another object of this invention to provide a safety restraint sensor system that uses a Hall element and a magnet to indicate a latched position and/or an unlatched position.

It is still another object of this invention to provide a safety restraint sensor system having minimal moving mechanical parts.

A safety restraint sensor system of this invention preferably comprises a housing having an assembly of components including a latch. The latch is preferably movably mounted with respect to the housing and is movable between a latched position and an unlatched position. A vane, constructed of a ferrous material, preferably projects from the latch. The vane is therefore also movable with respect to the housing in a like manner as the latch.

A magnet is mounted with respect to the housing adjacent a Hall element. The Hall element is preferably positioned outside of a magnetic field of the magnet. The magnet and the Hall element are preferably aligned with the vane of the latch. As the latch moves from the unlatched position to the latched position, the vane approaches the magnet and the Hall element.

In the latched position, the latch is preferably fully engaged with a buckle. In an unlatched position, the latch is movable with respect to the buckle and vice versa. The buckle, preferably constructed of a ferrous material, is engageable with the latch and in the latched position is lockingly fixed with respect to the latch.

In the unlatched position, the vane and the buckle are preferably positioned outside of the magnetic field of the magnet so that the sensor remains off. In the latched position, both the vane and the buckle are preferably positioned within the magnetic field of the magnet. In the latched position, the magnetic field passes through the magnet, the vane, the Hall element and the buckle. Thus, only by having the vane (attached to the latch) and the buckle in place, will the magnetic field path be routed through the Hall element/ magnetic transducer to activate a sensor.

When the Hall element is subjected to the magnetic field in the latched position, the Hall element preferably electrically communicates with a sensor. The sensor preferably emits a signal to a safety restraint, such as a seat belt or an air bag, or an indicator light. The signal preferably indicates that the buckle and the latch are in the latched position or the unlatched position.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
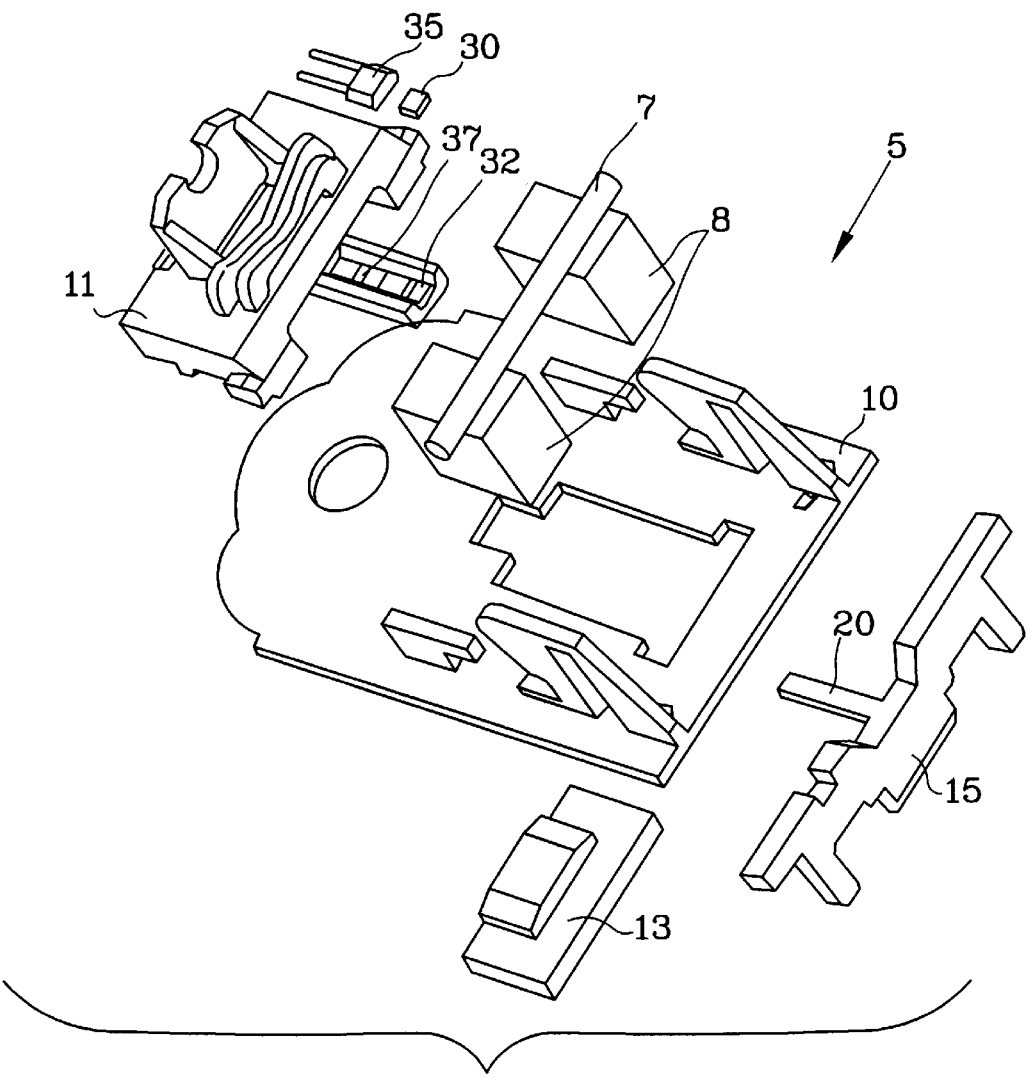
FIG. 1 is an exploded perspective view of a housing assembly, according to one preferred embodiment of this invention.
Figure 2:
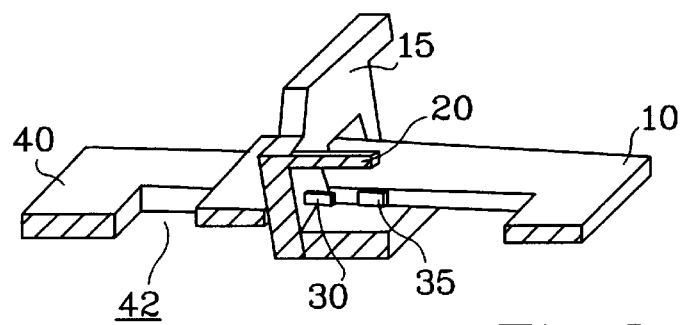
FIG. 2 is a cross-sectional perspective view taken through a center of a latch and a buckle, according to one preferred embodiment of this invention.
Figure 3:
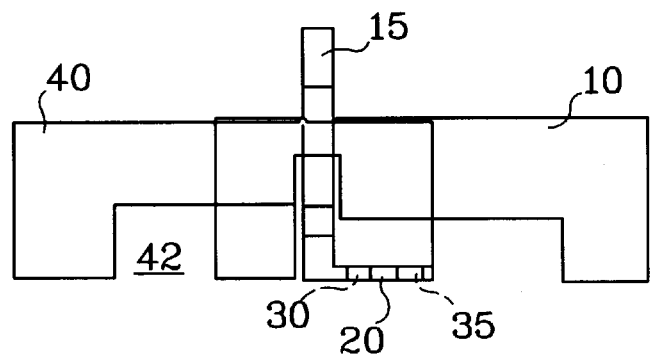
FIG. 3 is a top view of the cross-sectional view shown in FIG. 2.
Figure 4:
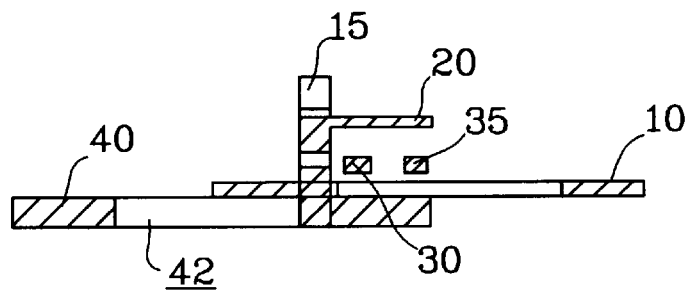
FIG. 4 is a front view of the cross-sectional view shown in FIG. 2.
Figure 5:
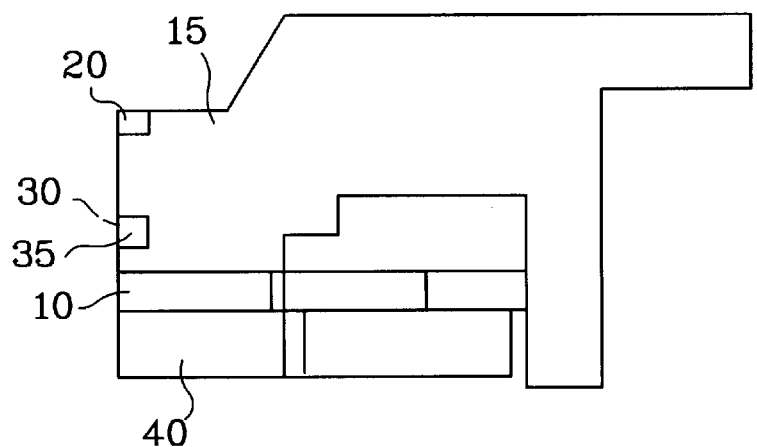
FIG. 5 is a side view of the cross-sectional view shown in FIG. 2.

FIG. 1 shows housing 5 for a safety restraint sensor system according to one preferred embodiment of this invention. Housing 5 preferably comprises an assembly of components such as pivot 7, counterweights 8, carrier plate 10, spring holding block 11, ejector 13 and latch 15. Housing 5 and associated components are preferably constructed of materials selected for strength and non-magnetic characteristics. Carrier plate 10 preferably provides a support surface for housing 5 and associated components. Pivot 7, counterweights 8, spring holding block 11, and ejector 13 are preferably designed and positioned to facilitate releasable engagement between latch 15 and an engagement means, such as buckle 40 shown in FIGS. 2–5.

Latch 15 is preferably movably mounted with respect to housing 5. Latch 15 is movable between a latched position and an unlatched position. In the latched position, latch 15 is preferably fully engaged within aperture 42 of buckle 40. In an unlatched position, latch 15 is movable with respect to buckle 40. In one preferred embodiment of this invention, latch 15 is spring biased toward a latch position using coil springs, leaf springs and/or any other suitable spring or other biasing element known to those having ordinary skill in the art.

According to a preferred embodiment of this invention, vane 20 projects from latch 15. Vane 20 is preferably constructed of a ferromagnetic material. In one preferred embodiment of this invention, shown in FIG. 1, vane 20 projects from a center portion of latch 15, generally perpendicular to latch 15.

Magnet 30 is preferably mounted with respect to housing 5, i.e., on or about housing 5 in a fixed location. In one preferred embodiment of this invention, shown in FIG. 1, magnet 30 is positioned within magnet detent 32 within spring holding block 11 of housing 5.

As shown in FIGS. 2–5, Hall element 35 is preferably mounted with respect to housing 5. When subjected to a magnetic field, Hall element 35 responds with an output voltage proportional to the magnetic field strength. Other magnetic transducers, such as magnetoresistive transducers or the like may be used in place of Hall element 35. Additional electronics, such as signal conditioning electronics may be combined with Hall element 35 to alter, limit and/or control an output signal. When Hall element 35 is combined with such signal conditioning electronics the result is a Hall effect transducer. Throughout this specification and in the claims, the term Hall effect transducer may be used interchangeably with Hall element 35.

Figure 6:
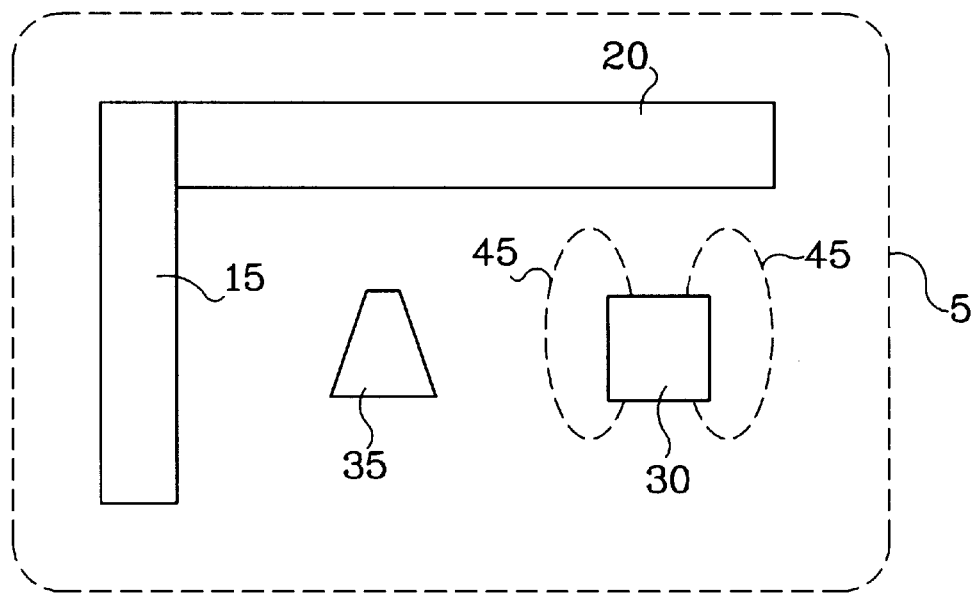
FIG. 6 is a diagrammatic side view of a safety restraint sensor system in an unlatched position, according to one preferred embodiment of this invention.

Hall element 35 may be mounted with respect to housing 5 in Hall detent 37 in spring holding block 11. Hall element 35 is preferably mounted in a manner to prevent unwanted magnetic interference from sources outside of housing 5. Hall element 35 is preferably positioned near magnet 30 in housing 5 but outside of magnetic field 45 of magnet 30. A representation of magnetic field 45 is best shown in FIG. 6. The relative positions of Hall element 35 and magnet 30 may be interchanged, therefore, in one preferred embodiment of this invention, Hall element 35 may be positioned in magnet detent 32 and magnet 30 may be positioned in Hall detent 37.

Figure 9:
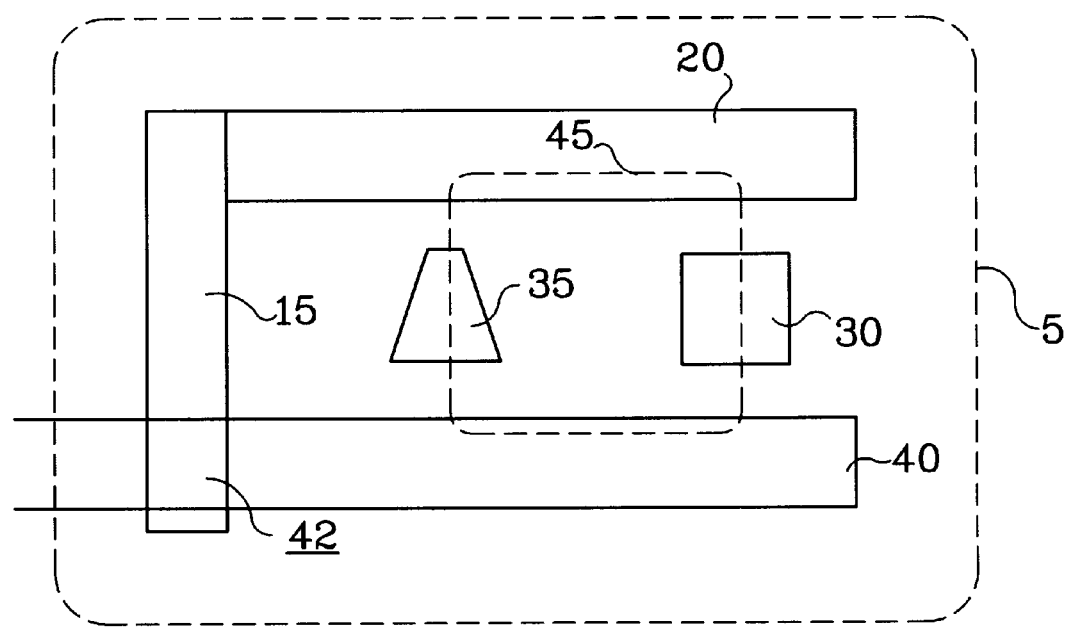
FIG. 9 is a diagrammatic side view of a safety restraint sensor system in a latched position, according to one preferred embodiment of this invention.

Magnet 30 and Hall element 35 are preferably close to each other within housing 5 and aligned with vane 20 of latch 15. Preferably, as latch 15 moves from an unlatched position to a latched position, vane 20 approaches magnet 30 and Hall element 35. However, vane 20 alone does not carry magnetic field 45 sufficiently to activate Hall element 35, as further explained below. FIG. 6 shows a representation of one preferred embodiment of this invention in an unlatched position. FIG. 9 shows a representation of one preferred embodiment of this invention in a latched position. As shown, vane 20 moves closely adjacent magnet 30 and Hall element 35 in the latched position.

As shown in FIGS. 2–5, buckle 40 is engageable with latch 15. Buckle 40 is preferably constructed from a ferromagnetic material. In one preferred embodiment of this invention, buckle 40 has aperture 42 or other means for engaging latch 15 known to those having ordinary skill in the art.

As shown in FIG. 6, in the unlatched position, vane 20 is positioned outside of magnetic field 45 of magnet 30. In the unlatched position, buckle 40 is typically outside of housing 5, therefore buckle 40 is also preferably positioned outside of magnetic field 45 of magnet 30 in the unlatched position.

Figure 7:
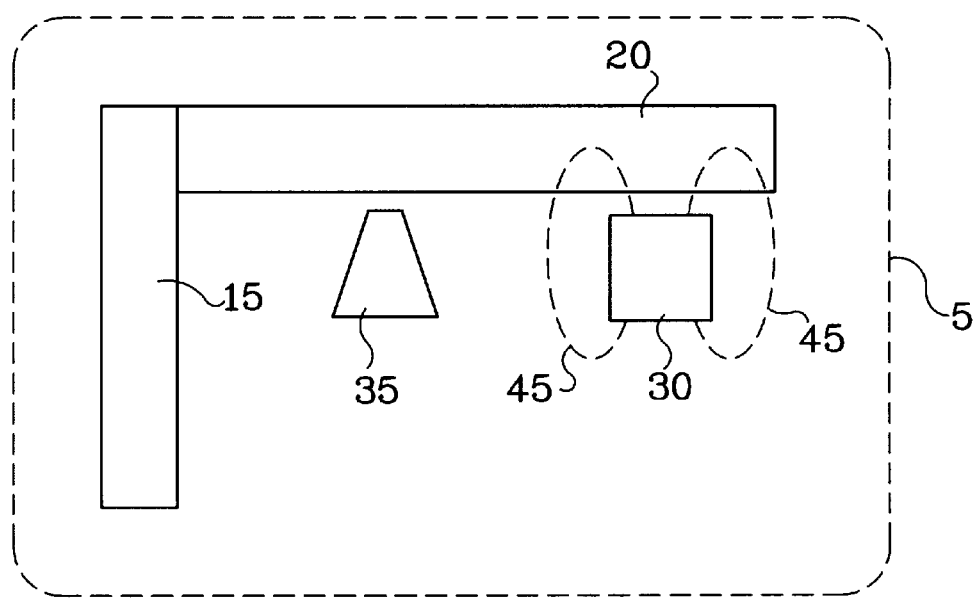
FIG. 7 is a diagrammatic side view of a safety restraint sensor system in a false latch position, according to one preferred embodiment of this invention.
Figure 8:
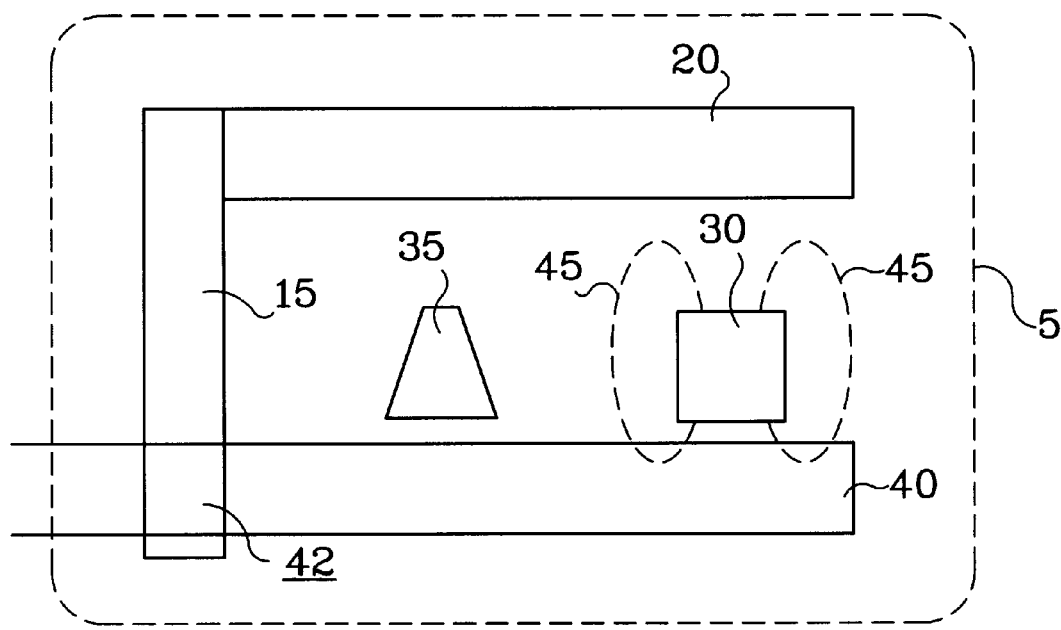
FIG. 8 is a diagrammatic side view of a safety restraint sensor system in a false latch position, according to one preferred embodiment of this invention.

FIGS. 7 and 8 show possible false latch conditions. FIG. 7 shows a false latch condition wherein buckle 40 is not inserted into housing 5 but latch 15 shifts into a latched position and as a result vane 20 shifts into magnetic contact with magnet 30 and close proximity with Hall element 35. Magnetic field 45 contacts vane 20 however does not travel through Hall element 35. Therefore, in the false latch condition shown in FIG. 7, the safety restraint sensor system does not indicate a latched condition.

FIG. 8 shows a false latch condition wherein buckle 40 is inserted into housing 5 but latch 15 does not shift into a latched position and as a result vane 20 does not shift into magnetic contact with magnet 30 and close proximity with Hall element 35. In this false latch condition, magnetic field 45 contacts buckle 40 however does not travel through Hall element 35. Therefore, in the false latch condition shown in FIG. 8, the safety restraint sensor system does not indicate a latched condition.

In the latched position, vane 20 and buckle 40 are preferably positioned within magnetic field 45 of magnet 30. As shown diagrammatically in FIG. 9, magnetic field 45 is distributed through magnet 30, vane 20, Hall element 35 and buckle 40. Hall element 35 preferably activates when latch 15 is in the latched position with buckle 40. As shown in FIGS. 6 and 9, vane 20 in the latched position is preferably positioned at a first distance from magnet 30, and in the unlatched position vane 20 is preferably positioned at a second distance from magnet 30. The first distance is preferably less than the second distance.

In the latched position, latch 15 fully engages with buckle 40, such as by extending through aperture 42 and interfering with movement of buckle 40. In one preferred embodiment of this invention, latch 15 extends through aperture 42 causing vane 20 to move correspondingly through the distance that latch 15 travels to extend through aperture 42. As shown in FIG. 9, in the latched position, buckle 40 preferably extends into housing 5 and extends into a position adjacent magnet 30 and Hall element 35. FIGS. 2–5 each show separate views of buckle 40 in the latched position with latch 15. Preferably, in the latched position, magnet 30 and Hall element 35 are positioned between buckle 40 and vane 20. Thus, only by having vane 20 (attached to latch 15) and buckle 40 in place will magnetic field 45 path be routed through Hall element 35 to activate a sensor.

The following chart summarizes the various conditions shown in FIGS. 6–9:

| Device as Shown in | Restraint Condition | Latch Position | Buckle Condition | Sensor Condition |
| --- | --- | --- | --- | --- |
| FIG. 6 | unlatched | latch up | no buckle | off |
| FIG. 7 | false latch | latch down | no buckle | off |
| FIG. 8 | false latch | latch up | buckle present | off |
| FIG. 9 | latched | latch down | buckle present | on |

Figure 11:
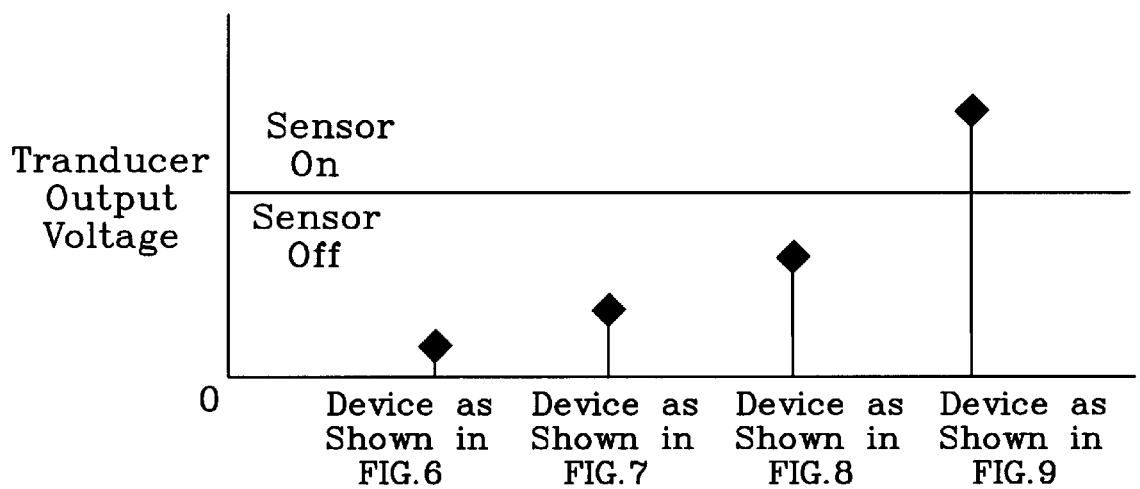
FIG. 11 is a chart showing representative transducer output voltages generated by the configurations of the safety restraint sensor systems shown in FIGS. 6–9.

FIG. 11 shows representative values of transducer output voltage, such as Hall element output voltage, for the latch conditions shown in each of FIGS. 6–9. As shown in FIG. 11, the transducer output voltage is at its highest value when the sensor is on, meaning the safety restraint is in a latched condition.

When buckle 40 is removed from housing 5, latch 15 disengages from buckle 40. In one preferred embodiment of this invention, ejector 13 assists latch 15 in disengaging from buckle 40. As latch 15, disengages from buckle 40, vane 20 slides back into the unlatched position and Hall element 35 returns to a deactivated state.

Figure 10:
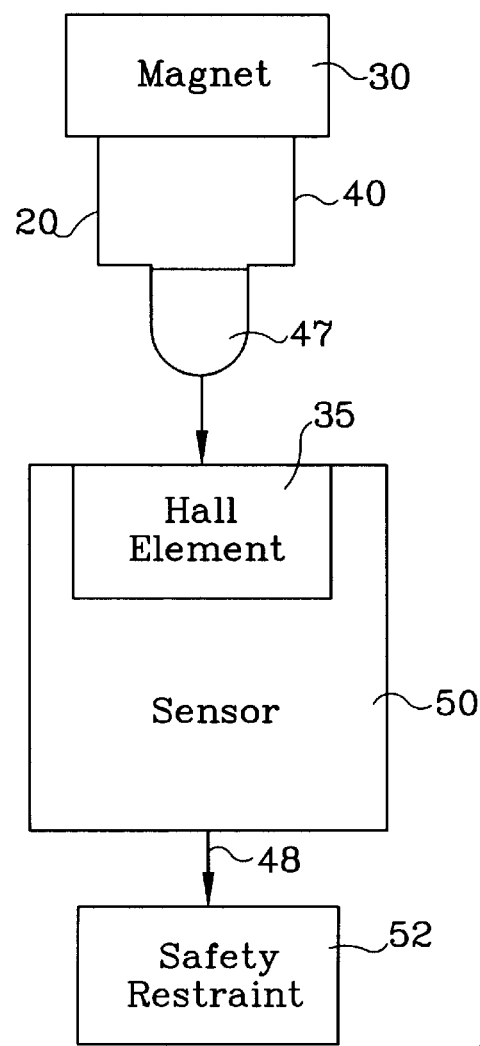
FIG. 10 is a flow diagram of a safety restraint sensor system, according to one preferred embodiment of this invention.

As shown schematically in FIG. 10, in one preferred embodiment of this invention, when Hall element 35 is subjected to magnetic field in the latched position, through correct placement of vane 20 and with buckle 40 acting like an AND gate 47, Hall element 35 preferably electrically communicates with sensor 50. In one preferred embodiment of this invention, Hall element 35 is integrated with signal conditioning electronics to form a Hall effect transducer, and thus sensor 50. Sensor 50 emits signal 48 to safety restraint 52, such as a seat belt or an air bag, or to an external indicator, such as an indicator light. Signal 48 preferably indicates that buckle 40 and latch 15 are in the latched position or the unlatched position. In this manner, air bags, seat belts, seat occupancy sensors and other such components may be electronically linked together to determine whether passengers are present in various locations within a vehicle. Vehicle electronics may then accordingly determine whether certain air bags should fire or whether seat belts should be automatically tightened during a collision.

While in the foregoing specification this invention has been described in relation to certain preferred embodiments thereof, and many details have been set forth for purpose of illustration, it will be apparent to those skilled in the art that the safety restraint sensor system is susceptible to additional embodiments and that certain of the details described herein can be varied considerably without departing from the basic principles of this invention.

We claim:

1. A safety restraint sensor system comprising:
   a housing, a latch movably mounted with respect to the housing, the latch movable between a latched position and an unlatched position;
   a vane projecting from the latch;
   a magnet mounted with respect to the housing;
   a Hall element mounted with respect to the housing and outside of a magnetic field of the magnet; and
   a buckle engageable with the latch, whereby in the latched position the vane and the buckle positioned within the magnetic field of the magnet distribute a magnetic field through the Hall element, and in the unlatched position the vane and the buckle are positioned outside of the magnetic field of the magnet.

2. The safety restraint sensor system of claim 1 wherein the vane in the latched position is at a first distance from the magnet, the vane in the unlatched positioned is at a second distance from the magnet, and the first distance is less than the second distance.

3. The safety restraint sensor system of claim 1 wherein the buckle has an aperture and the latch in the latched position is engaged within the aperture.

4. The safety restraint sensor system of claim 1 wherein the Hall element activates when the latch is in a latched position with the buckle.

5. The safety restraint sensor system according to claim 1 wherein in the latched position the magnetic field of the magnet passes through the buckle and the vane and the Hall element.

6. The safety restraint sensor system according to claim 1 wherein a sensor in communication with the Hall element electrically communicates with a seat belt restraint.

7. The safety restraint sensor system according to claim 1 wherein a sensor in communication with the Hall element electrically communicates with an air bag restraint.

8. The safety restraint sensor system according to claim 1 wherein the magnet and the Hall element are positioned between the buckle and the vane in the latched position.

9. The safety restraint sensor system according to claim 1 wherein the vane comprises a ferromagnetic material.

10. The safety restraint sensor system according to claim 1 wherein the vane comprises a soft ferromagnetic material.

11. A safety restraint sensor system comprising:
   a latch positioned within a housing, a vane projecting from the latch;
   a magnet and a Hall element positioned in the housing apart from each other; and
   a buckle engageable with the latch, the magnet and the Hall element positioned between the buckle and the vane to activate a magnetic flux through the Hall element when the buckle is engaged with the latch.

12. The safety restraint sensor system of claim 11 wherein when the latch is engaged with the buckle, the vane is at a first distance from the magnet, and when the latch is disengaged with the buckle, the vane is at a second distance from the magnet, and the first distance is less than the second distance.

13. The safety restraint sensor system of claim 11 wherein the buckle has an aperture and the latch is engaged within the aperture when the latch is engaged with the buckle.

14. The safety restraint sensor system according to claim 11 wherein when the latch is engaged with the buckle, the magnetic field of the magnet passes through the buckle and the vane and the Hall element.

15. The safety restraint sensor system according to claim 11 wherein a sensor in communication with the Hall element electrically communicates with a seat belt restraint.

16. The safety restraint sensor system according to claim 11 wherein a sensor in communication with the Hall element electrically communicates with an air bag restraint.

17. The safety restraint sensor system according to claim 11 wherein the vane is positioned in a magnetic field of the magnet when the buckle is engaged with the latch.

18. A method for detecting whether a buckle and a latch are in a latched position or an unlatched position within a housing of a safety restraint, the method comprising:
   positioning a vane of the latch outside of a magnetic field of a magnet;
   inserting the buckle into the housing and into the magnetic field of the magnet;
   moving the latch into the latched position and the vane into the magnetic field of the magnet; and
   passing the magnetic field through the vane and the buckle to activate a Hall effect transducer.

19. The method of claim 18 further comprising sending a signal from the Hall effect transducer to a safety restraint sensor.

20. The method of claim 18 further comprising positioning the magnet and the Hall effect transducer between the vane and the buckle in the latched position.

* * * * *